United States Patent [19]

Ichikawa

[11] Patent Number: 5,506,701
[45] Date of Patent: Apr. 9, 1996

[54] HOLOGRAM COLOR FILTER, LIQUID CRYSTAL DISPLAY DEVICE USING THE SAME, AND FABRICATION PROCESS OF HOLOGRAM COLOR FILTER

[75] Inventor: Nobuhiko Ichikawa, Tokyo, Japan

[73] Assignee: Dai Nippon Printing Co., Ltd., Tokyo, Japan

[21] Appl. No.: 187,549

[22] Filed: Jan. 28, 1994

[30] Foreign Application Priority Data

| Jan. 28, 1993 | [JP] | Japan | 5-012170 |
| Feb. 1, 1993 | [JP] | Japan | 5-014572 |
| Apr. 23, 1993 | [JP] | Japan | 5-097517 |

[51] Int. Cl.⁶ ......................................... G02B 5/32
[52] U.S. Cl. .................... 359/15; 359/22; 359/53
[58] Field of Search ........................ 359/13, 15, 22, 359/23, 24, 25, 53

[56] References Cited

U.S. PATENT DOCUMENTS

| 4,807,978 | 2/1989 | Grinberg et al. | 359/900 |
| 5,103,325 | 4/1992 | Andrews et al. | 359/23 |
| 5,267,060 | 11/1993 | Colton | 359/15 |

*Primary Examiner*—Samuel A. Turner
*Attorney, Agent, or Firm*—Sughrue, Mion, Zinn, Macpeak & Seas

[57] ABSTRACT

The present invention has for its object to spectrally diffract white light by a hologram for the illumination of a given position, thereby achieving some considerable improvement in the efficiency of utilization of backlight for liquid crystal display, etc., and makes use of a difference in the angle of diffraction of a hologram 5 depending on wavelength to diffract the wavelength components of the colors displayed into liquid crystal cells R, G and B of a liquid crystal display element 10 located at the back side of the hologram 5, thereby achieving some considerable improvement in the efficiency of utilization of backlight. As the hologram 5, an array form of converging unit holograms with the efficiency of diffraction independent, or less dependent, on wavelength, or other equivalent hologram arrangement may be used.

65 Claims, 14 Drawing Sheets

HOLOGRAM COLOR FILTER, LIQUID CRYSTAL DISPLAY DEVICE USING THE SAME, AND FABRICATION PROCESS OF HOLOGRAM COLOR FILTER

BACKGROUND OF THE INVENTION

The present invention relates generally to a color filter making use of a hologram and, more particularly, to a hologram color filter designed to improve the efficiency of utilization of backlight, etc., by using a hologram as well as a liquid crystal display device with a built-in hologram color filter and a fabrication process of such a hologram color filter.

So far, backlight for displaying purposes has been indispensable for a color liquid crystal display device with a built-in color filter. When the color liquid crystal display device is immediately illuminated by white light from behind, however, the efficiency of utilization of the white light is very low for the following major reasons:

1. The area occupied by black matrixes except the cell of each color is large, and thus light striking on them will be wasted.
2. Of the white light incident onto each pixel, the color components passing through the color filters R (red), G (green) and B (blue) is limited to one color. Thus, other complementary color components will again be wasted.
3. Each color filter has light loss due to absorption.

To solve such problems, it has been known in the art to locate a microlens array 2 in front of a color filter 1, as shown in FIG. 17 as an example, to converge white backlight 3 onto color filter cells R, G and B, thereby improving the efficiency of utilization of the backlight 3. In connection with FIG. 17, it is understood that reference numeral 4 represents black matrixes located between the color filters R and G, and G and B.

Even with this technique, however, the problem 2 mentioned above remains unsolved, because it is impossible to separate the white light 3 into its spectral components for the illumination of the color filter cells R, G and B. Moreover, the problem 3 mentioned above remains unsolved, because reliance is still on the color filter 1.

There is another plausible process in which a hologram is located in front of each pixel such that the red, green and blue components are selectively converged onto the red, green and blue color filters, respectively. According to this process, it is possible to improve the efficiency of utilization of backlight because each pixel is illuminated by the white light while it is separated into its spectral components.

For this holographic process, however, it is required that one hologram be subjected to trichromatic multiple exposure, or that three holograms, each for one color, be superposed together at the same position. The disadvantages of this process are that the trichromatic multiple exposure gives rise to a lowering of the efficiency of diffraction of the hologram for each color, and the superposition of three holograms incurs difficulty in alignment, and is very troublesome to do as well.

SUMMARY OF THE INVENTION

In view of the prior art problems mentioned above, an object of the present invention is to spectrally diffract white light by a hologram for the illumination of a given position, thereby achieving some considerable improvement in the efficiency of utilization of backlight for liquid crystal display, etc.

To achieve the above object, the present invention provides a color filter using a hologram, characterized in that incident light is spectrally diffracted by the hologram into light of different wavelength and the light is emitted to a desired position at a predetermined spatial period.

Preferably, the hologram is produced by setting in array converging unit holograms with the efficiency of diffraction independent, or less dependent, on wavelength.

In another preferable embodiment, the hologram is made up of uniform interference fringes with the efficiency of diffraction independent, or less dependent, on wavelength, and an array form of converging elements is arranged on the light-striking or emerging side of said hologram.

In still another preferable embodiment, the hologram is made up of doubly recorded or superposed, two uniform interference fringes that are selective in terms of the wavelength to be diffracted and the angle of diffraction, and an array form of converging elements is arranged on the light-striking or emerging side of said hologram.

Preferably, the hologram color filter is located on the side of a liquid crystal display element onto which backlight is incident, said liquid crystal display element being made up of a periodic arrangement of liquid crystal cells. When the hologram color filter is built in a direct-view liquid crystal display device, it is desired that a light-diffusing means be located at any position on the light-emerging side of said hologram.

Preferably, the liquid crystal display panel (or element) is provided with a light-blocking means at a position corresponding to a region between liquid crystal cells, and between the liquid crystal display element and the light-blocking means there is an additional color filter.

Preferably, the hologram color filter is located on the side of the liquid crystal display panel (or element) onto which backlight is incident, said liquid crystal display device including means for projecting the image displayed.

Alternatively, the hologram color filter located on the entrance side of an imaging device made up of a periodic arrangement of photodetection elements.

According to another aspect of the invention, there is provided a liquid crystal display device using a hologram color filter, which is illuminated by backlight from behind to provide a color display, characterized in that a hologram with the efficiency of diffraction independent, or less dependent, on wavelength is located on the side of said device onto which backlight is incident, and wavelength components spectrally diffracted by said hologram are allowed to strike onto liquid crystal cells for providing the corresponding colors.

Preferably, a light-blocking means is located at a position corresponding to a region between said liquid crystal cells, and another color filter of different color is periodically located with respect to the adjacent liquid crystal cell.

Preferably, the hologram is made up of converging unit holograms set in array at a period corresponding to said period, and each unit hologram spectrally diffracts backlight striking almost vertically on the hologram plane into a position of a set of liquid crystal cells in offset configuration.

Alternatively, the hologram may be made up of converging unit holograms set in array at a period corresponding to said period, and each unit hologram spectrally diffracts backlight striking obliquely on the hologram plane into a position of a set of liquid crystal cells in in-line configuration.

Preferably, the hologram is made up of uniform interference fringes with the efficiency of diffraction independent, or less dependent, on wavelength, and converging elements are arranged on the side of said hologram on or from which backlight strikes or is emitted at a period corresponding to said period.

Preferably, a converging element is located at a position corresponding to each cell between said hologram and liquid crystal cells.

According to still another aspect of the invention, there is provided a liquid crystal display device using a hologram color filter, which is illuminated by backlight from behind to provide a color display, characterized in that said hologram color filter is made up of doubly recorded or superposed, two uniform holograms that are selective in terms of the wavelength to be diffracted and the angle of diffraction and an array of converging elements located on the light-striking or emerging side of said hologram, and is located on the side of the display device onto which backlight is incident, whereby wavelength components spectrally diffracted by said hologram are allowed to strike on liquid crystal cells for representing the corresponding colors.

Preferably, a photopolymer is used as the material for recording said hologram.

Preferably, the hologram comprises a relief hologram or a computer-generated hologram.

According to a further aspect of the invention, there is provided a fabrication process of a hologram color filter which is produced by setting in array converging unit holograms with the efficiency of diffraction independent, or less dependent, on wavelength, and which spectrally diffracts light incident thereon into light of different wavelength, thereby emitting said light to a desired position at a predetermined spatial period, characterized by producing a computer-generated hologram having said properties by writing, bringing the thus produced computer-generated hologram in contact with a photosensitive material or superposing both together with a gap therebetween, and illuminating CGH by coherent light such that light diffracted by the computer-generated hologram and undiffracted light propagated rectilinearly through the computer-generated hologram interfere with each other in the photosensitive material for copying the computer-generated hologram.

Preferably, the copied hologram is used as the original for further copying.

According to a still-further aspect of the invention, there is provided a fabrication process of a hologram color filter which is produced by setting in array converging unit holograms with the efficiency of diffraction independent, or less dependent, on wavelength, and which spectrally diffracts light incident thereon into light of different wavelength, thereby emitting said light to a desired position at a predetermined spatial period, characterized by producing a relief computer-generated hologram having said properties by writing, coating a photosetting resin such as ultraviolet setting resin on the relief surface of the thus produced relief computer-generated hologram, and irradiating the resin with light such as ultraviolet rays for setting, thereby making a copy in the form of a relief hologram.

By use of the hologram color filter according to the present invention is it possible to provide a bright display or image, because incident light is spectrally diffracted by the hologram into light of different wavelength, which can in turn be emitted to a desired position at a predetermined spatial period; that is, since there is no need of passing the incident light through a color filter, there is a limited loss by absorption. Moreover, since efficiently spectrally diffracted light can be converged at a given positions, it is possible to make full use of the wavelength components of backlight for color filters, etc., thereby achieving some considerable improvement in the efficiency of utilization of the backlight.

With the liquid crystal display device using the hologram color filter according to the present invention, it is possible to make full use of the wavelength components of the backlight for the color filter, thereby achieving some considerable improvement in the efficiency of utilization of the backlight. This is because the hologram that is not selective in terms of the wavelength to be diffracted is located on the side of incidence of the backlight such that the wavelength components spectrally diffracted by the hologram are allowed to strike on the color filter cells of the corresponding colors.

The fabrication process of a hologram color filter according to the present invention is characterized by producing a computer-generated hologram having given properties by writing, bringing the thus produced computer-generated hologram in contact with a photosensitive material or superposing both together with a gap therebetween, and illuminating CGH by coherent light such that light diffracted by the computer-generated hologram and undiffracted light propagated rectilinearly through the computer-generated hologram interfere with each other in the photosensitive material for copying the computer-generated hologram. Thus, it is possible to easily fabricate a microhologram array which can separate backlight into its spectral wavelength components so that they can be allowed to strike on the color filter of a liquid crystal display panel (or element) without being wasted and in which each microhologram is small enough to be commensurate to a color filter pixel. Also, similar holograms can be easily produced by using this as the original.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the following description, the principle and embodiments of the hologram color filter according to the invention will be explained with reference to the accompanying drawings.

Figure 1:
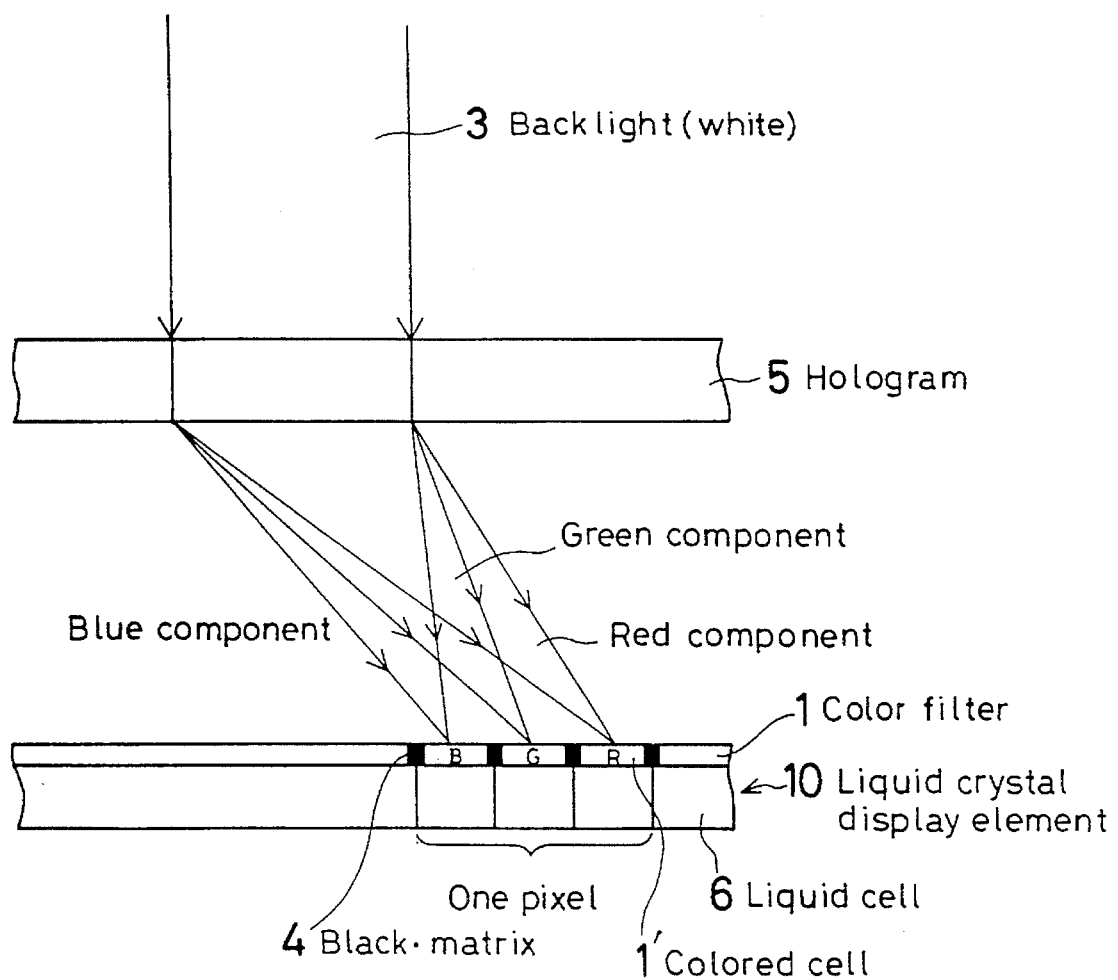
FIG. 1 is a schematic of the principle of the hologram color filter according to the invention.

The principle of the color filter according to the invention will first be explained with reference to FIG. 1. As illustrated in FIG. 1, a transmission hologram 5 is located on the side of a liquid crystal display element 10 onto which backlight 3 strikes. The liquid crystal display element 10 comprises a repetition of three adjacent liquid crystal cells 6 to represent trichromatic (red, green, and blue) components for each pixel. On the back side of the liquid crystal display element 10 there is arranged a color filter 1 made up of red, green and blue cells 1' that are in alignment with each liquid crystal cell 6 and have black matrixes 4 located between them. In another arrangement, the black matrixes 4 alone may be provided in the absence of the colored cells 1'. On both sides of the liquid crystal display element 10 there are located polarizing plates, although not illustrated.

The transmission hologram 5 is constructed in an array of unit holograms having the same pitch as the pixels, corresponding to each set of the three liquid crystal cells 6 representing one pixel of the liquid crystal display element 10. Then, each unit hologram is constructed in a Fresnel zone plate form, so that white backlight 3 striking almost vertically on the surface of the hologram is converged by diffraction on the pixel of the liquid crystal display element 10 that is located at a position offset from the corresponding unit hologram. As the hologram 5 use may be made of relief, phase, amplitude and other holograms with the efficiency of diffraction independent, or less dependent, on wavelength. Here the wording "the efficiency of diffraction independent, or less dependent, on wavelength" should be understood to mean a type that allows every wavelength to be diffracted by one diffraction grating, rather than a type that allows only a specific wavelength not to be diffracted and other wavelengths to be diffracted, as in the case of a Lippmann hologram (that is selective in terms of the wavelength to be diffracted and the angle of diffraction). Such a diffraction grating less dependent on wavelength generally varies the angle of diffraction depending on wavelength. Accordingly, the angle of diffraction by the unit hologram varies depending on the wavelength of the incident light 3, so that the converging position for each wavelength is dispersed in the direction parallel with the plane of the hologram 5. For this reason, the red, green and blue wavelength components of the incident white light 3 are respectively converged by diffraction at the positions of the color filter cell R or the liquid crystal cell 6 for representing red, the color filter cell G or the liquid crystal cell 6 for representing green, and the color filter B or the liquid crystal cell 6 for representing blue. Also, the color components can pass through the liquid crystal cells 6 without being substantially attenuated by the color filter cells R, G and B and the black matrixes 4, thereby representing colors depending on the states of the liquid crystal cells at the corresponding positions.

By making use of a difference in the angle of diffraction of the hologram depending on wavelength, it is thus possible to diffract the wavelength component of the color to be displayed and allow it to be incident on the liquid crystal cell 6 of each color of the liquid crystal display element 10 located behind the hologram 5, thereby enabling the respective wavelength components of the backlight to directly strike the each liquid crystal cell without being wasted. Consequently, the efficiency of utilization of the backlight is improved.

Figure 2:
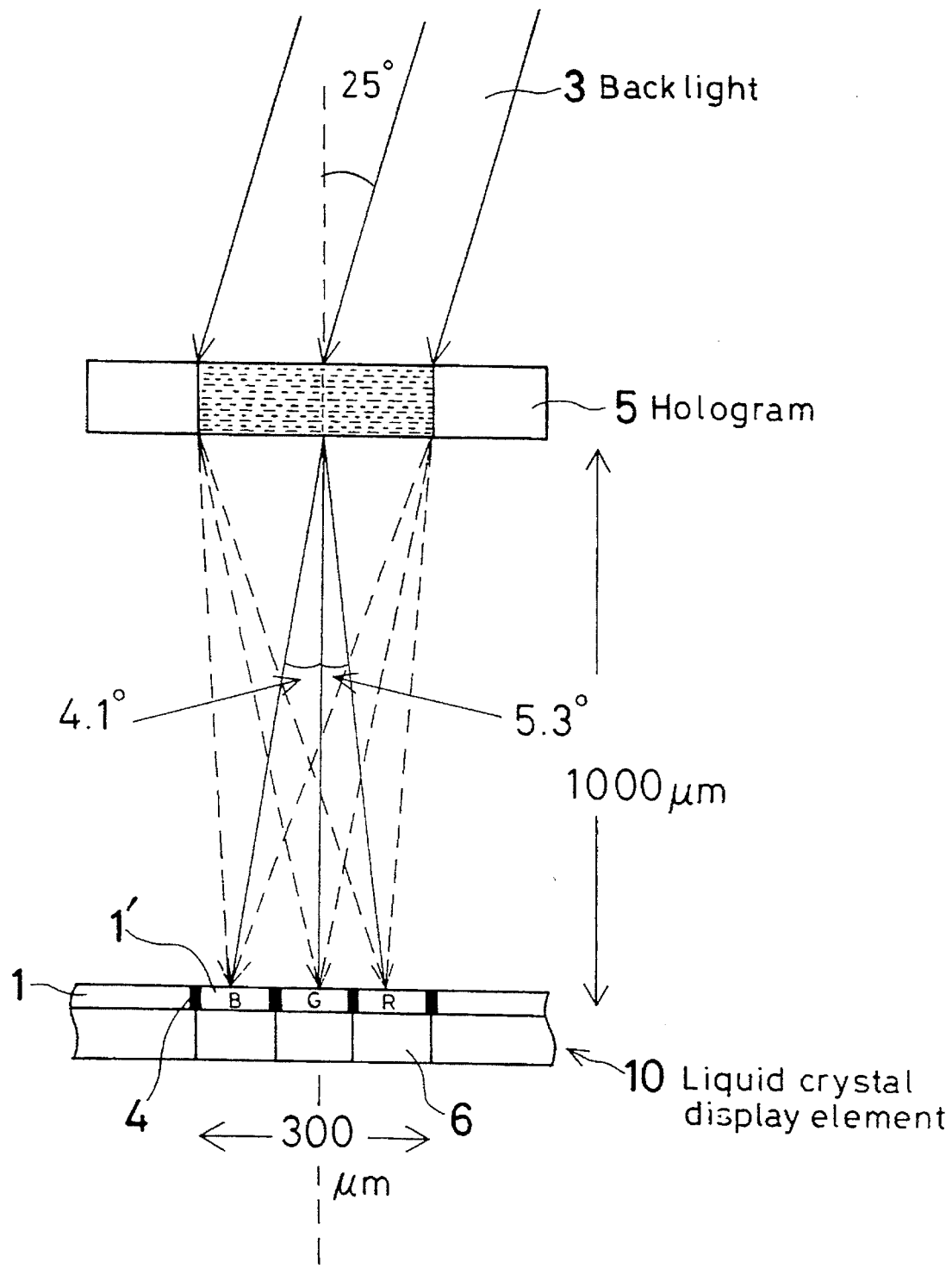
FIG. 2 illustrates a modification of the hologram color filter shown in FIG. 1.

In the above arrangement explained with reference to FIG. 1, the backlight 3 is allowed to strike almost vertically on the surface of the hologram. As shown in FIG. 2, however, it is also possible to allow backlight 3 to be incident on the plane of the hologram at a predetermined angle θ with the normal line of that surface. In the arrangement shown, the parallel backlight beams 3 are allowed to strike on the hologram at an angle of 25 degrees with the normal line. Then, the blue (460 nm), green (545 nm) and red (610 nm) wavelengths of the backlight 3 are converged by diffraction on the pixels that are located at the relative positions shown and are of the size shown. It should here be noted that the angle θ of incidence of the backlight on the surface of the hologram is determined by various conditions (e.g., the condition for recording the hologram 5, the thickness of the hologram 5 and distance between the hologram 5 and the liquid crystal display element 10).

Figure 3:
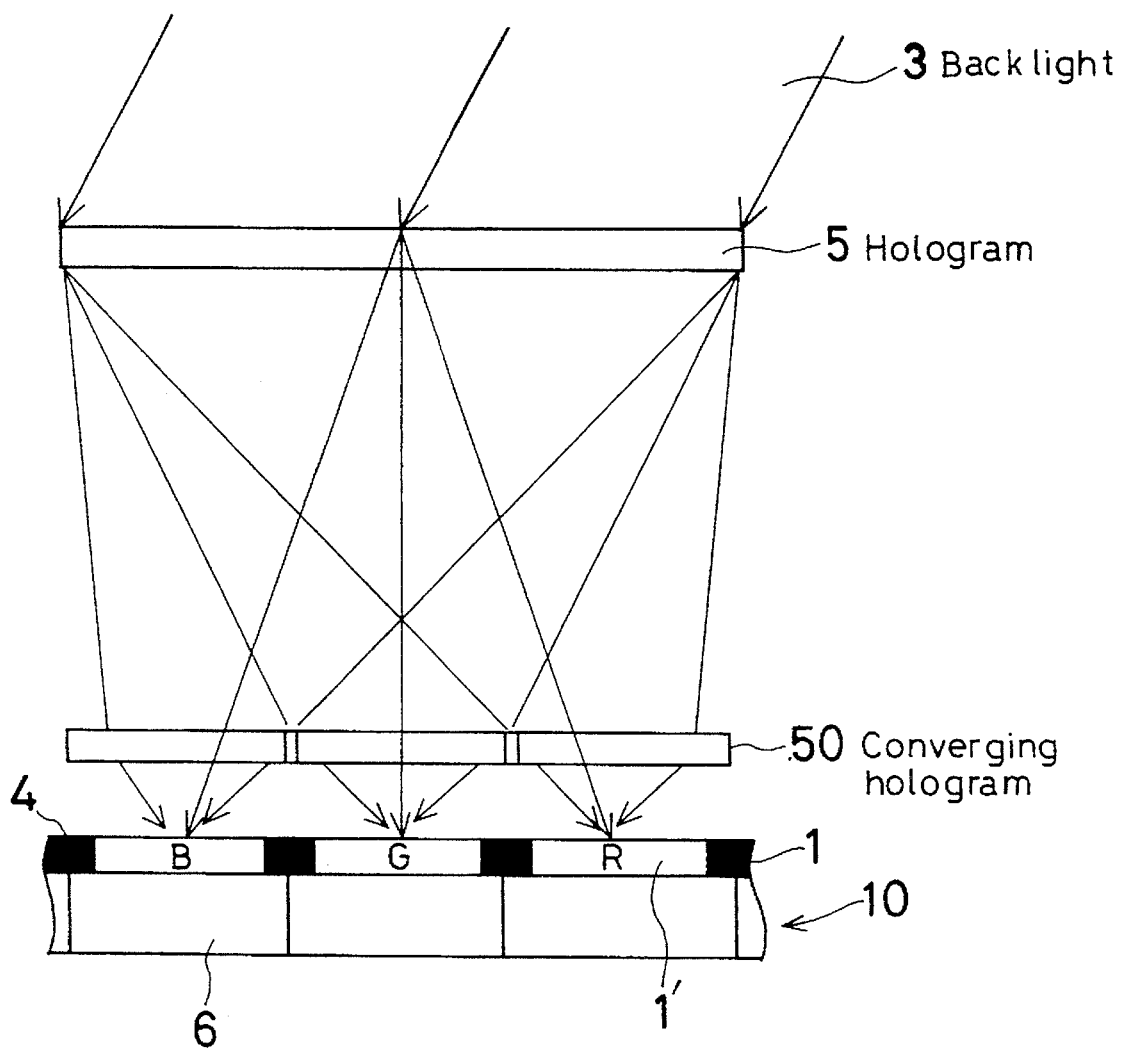
FIG. 3 is a schematic of one embodiment of the invention wherein a converging hologram is located between a hologram filter and a liquid crystal display element.

Reference will now be made to the embodiment shown in FIG. 3, wherein between such a hologram 5 as mentioned above and a liquid crystal display element 10 there are located converging holograms 50 in alignment with color filter cells R, G and B or red, green and blue liquid crystal cells 6 to achieve a more efficient convergence of the color components incident on them. This enables each color component to strike on each cell more efficiently and reduces the distance between the hologram 50 and the liquid crystal display element 10. In this embodiment, even when the light spectrally diffracted by the hologram 50 is cut off by the black matrix 4 and is wasted, such light can be further converged by the converging hologram 50. It is possible to prevent the spectrally diffracted components from striking on and being cut off by the black matrix 4. It is understood that microlenses may be used in place of the converging holograms 50.

Figure 4:
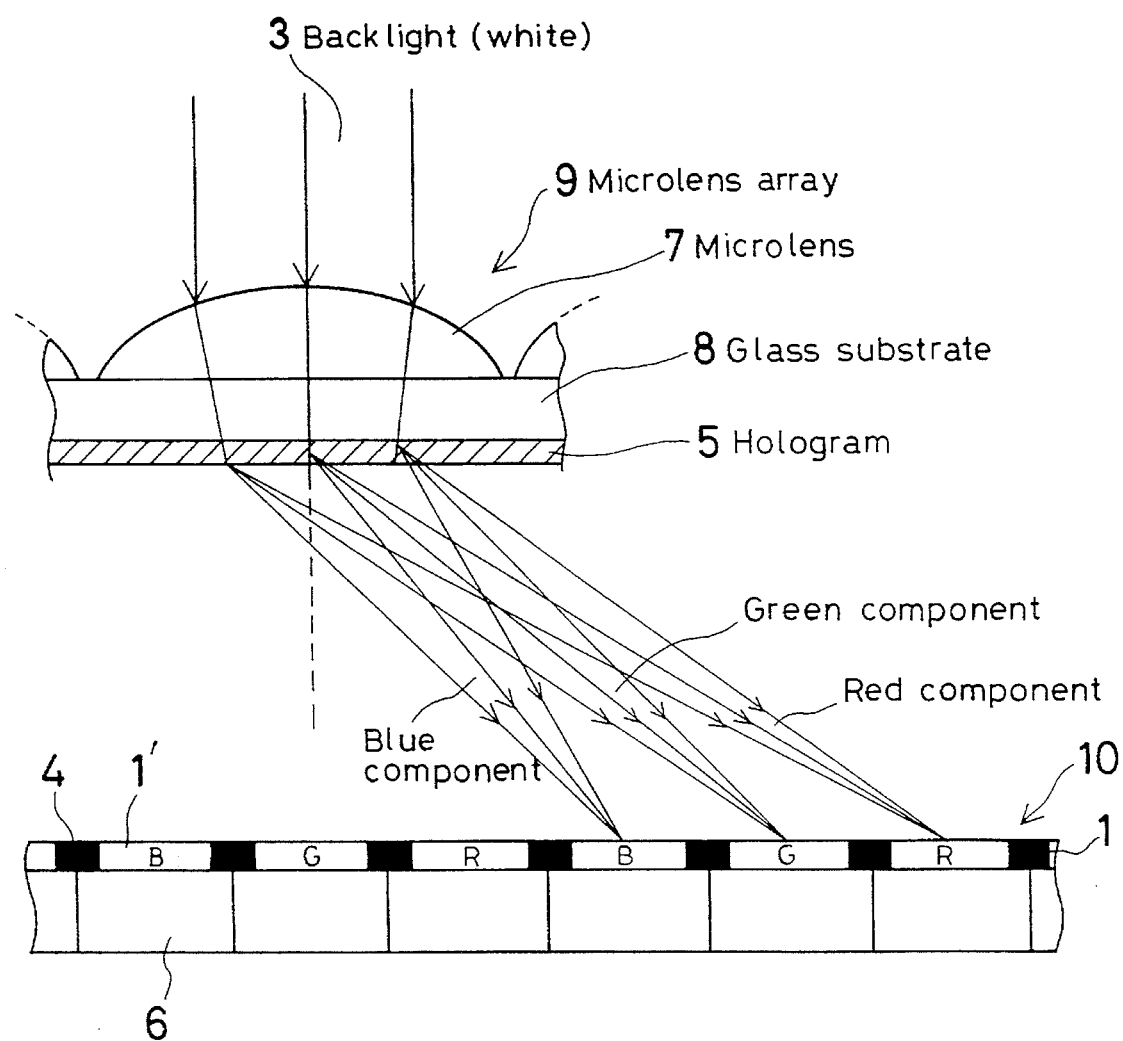
FIG. 4 illustrates another modification of the arrangement shown in FIG. 1.

In each of the arrangements explained with reference to FIGS. 1–3, an array of microholograms for wavelength dispersion, each in a Fresnel zone plate form, is provided corresponding to each set of red, green and blue liquid crystal cells. However, some considerable improvement in the efficiency of utilization of backlight is also achieved by using a uniform hologram acting as a diffraction grating that disperses wavelength and is less dependent on wavelength in combination with an array of microlenses, thereby making use of the action of the hologram to disperse wavelength. As shown in FIG. 4, an array g of microlenses 7, each having a diameter corresponding to the pixel pitch of a liquid crystal display element 10 and being provided on a glass plate 8, is located in front of the liquid crystal display element 10. A transmission hologram 5 made up of uniform interference fringes and less dependent on wavelength is integrally provided on the opposite side of the glass plate 8. In this arrangement, white backlight 3 converged by the microlenses 7 is diffracted and separated into its spectral components by the transmission hologram 5 at different angles depending on wavelength. As in the case of the arrangement shown in FIG. 1 or 3, the converging position for each wavelength is dispersed in the direction parallel with the plane of the hologram 5. The red, green and blue wavelength components of the incident white light 3 are respectively converged at the positions of the color filter cell R or the liquid crystal cell 6 for representing red, the color filter cell G or the liquid crystal cell 6 for providing green, and the color filter cell B or the liquid crystal cell 6 for representing blue, thereby enabling each color component to be displayed depending on the state of each liquid crystal cell 6. By using a transmission hologram 5 that has no property of converging light, comprises uniform interference fringes, and so is less dependent on wavelength, this arrangement has the major advantages of dispensing with alignment of the hologram 5 with the liquid crystal display element 10. Also, since the pitch of the microlens array 9 three times as large as the conventional arrangement shown in FIG. 17, it is easy to fabricate and align the microlens array 9.

Figure 5:
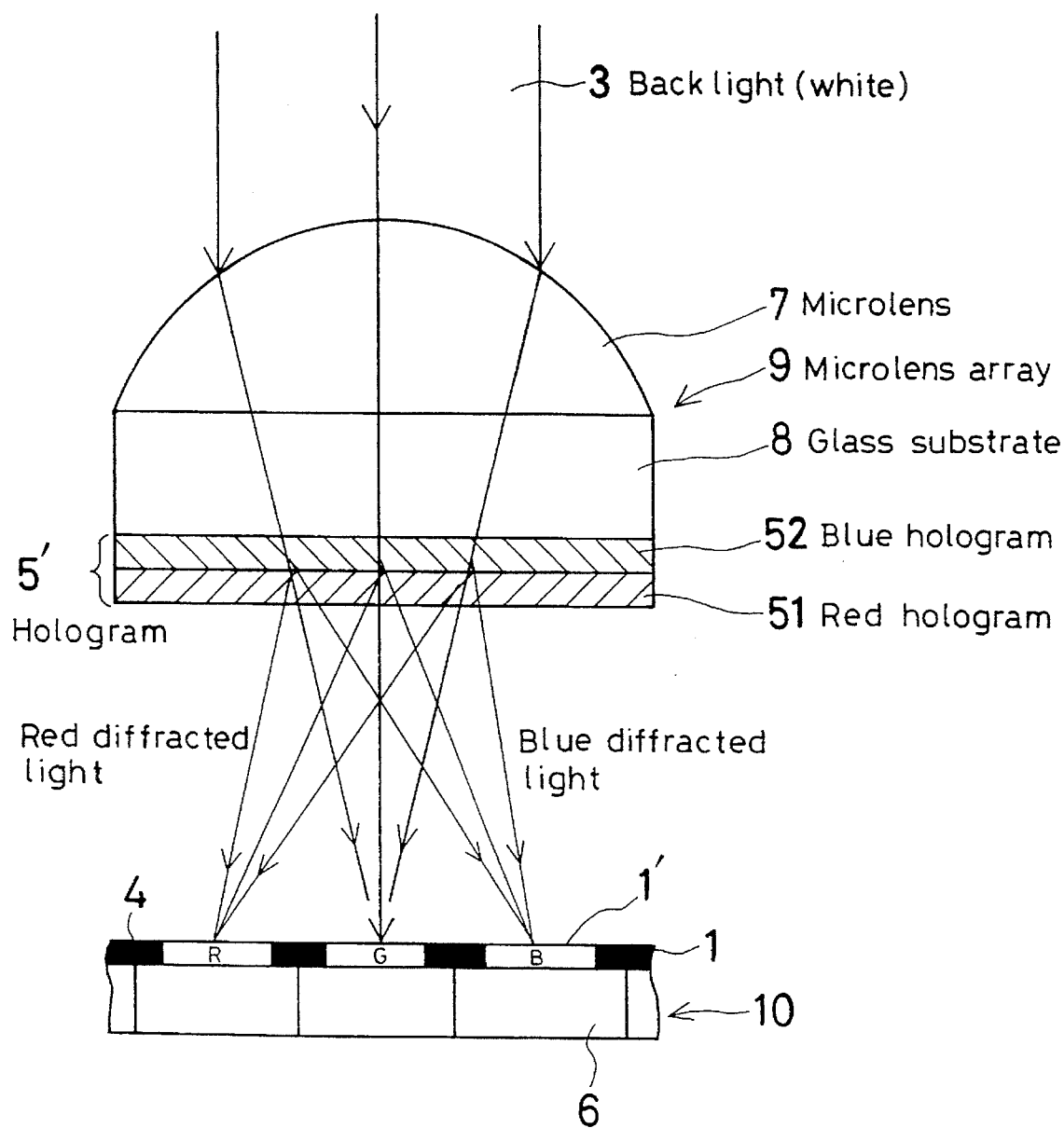
FIG. 5 is a schematic of a color filter made up of two uniform holograms that are selective in terms of the wavelength to be diffracted and the angle of diffraction.

It is here noted that even when use is made of holograms that are selective in terms of the wavelength to be diffracted and the angle of diffraction, for instance, Lippmann holograms that allow only a specific wavelength to be diffracted and all other wavelengths not to be diffracted, a similar hologram color filter may be constructed by superposing two uniform transmission holograms capable of diffracting two wavelengths or recording them twice in superimposed fashion, rather than by superposing three transmission holograms selective in terms of wavelength and angle and capable of diffracting three wavelengths or recording them three times in superposed fashion. This arrangement is shown in FIG. 5. Here, too, some considerable improvement in the efficiency of utilization of backlight is achieved by using uniform holograms acting as diffraction gratings selective in terms of wavelength and angle in combination with a microlens array, thereby making use of the selectivity of wavelength and angle by diffraction. As shown in FIG. 5, a microlens array 9 is located in front of a liquid crystal display element 10. The array 9 is obtained by arranging microlenses 7 with the diameters corresponding to the pixel pitch of the element 10 on a glass substrate 8. On the opposite side of the glass substrate 8 there is located a hologram assembly 5' made up of blue and red holograms 52 and 51, each comprising uniform interference fringes selective in terms of wavelength and angle. In this arrangement, most of the blue wavelength component of white backlight 3 condensed by the microlenses 7 is diffracted by the blue hologram 52 of the hologram assembly 5' and converges at the position of the color filter cell B or the liquid crystal cell 6 for representing blue. Most of the red wavelength component is diffracted by the red hologram 51 of the hologram assembly 5' and converges at the position of the color filter cell R or the liquid crystal cell 6 for representing red. The green component that is not diffracted by the hologram assembly 5' goes straightforward through the hologram assembly 5' and then converges at the position of the color filter cell G or the liquid crystal cell 6 for representing green. Thus, the red, green and blue wavelength components of the incident white light 3 are respectively converged at the positions of the color filter cells R, G and B or the liquid crystal cells 6 for representing red, green and blue, so that the respective color components can provide color displays depending on the states of the respective liquid crystal cells R, G and B. Since holograms that comprise unconverging, uniform interference fringes and that are selective in terms of wavelength and angle can be used for the hologram assembly 5', this arrangement has the advantages of dispensing with any alignment of the holograms 51 and 52 with the liquid crystal display element 10, and making the pitch of the microlens array 9 three times as large as that of the conventional arrangement shown in FIG. 17. Thus, fabricating and aligning the microlens array is easier.

Figure 17:
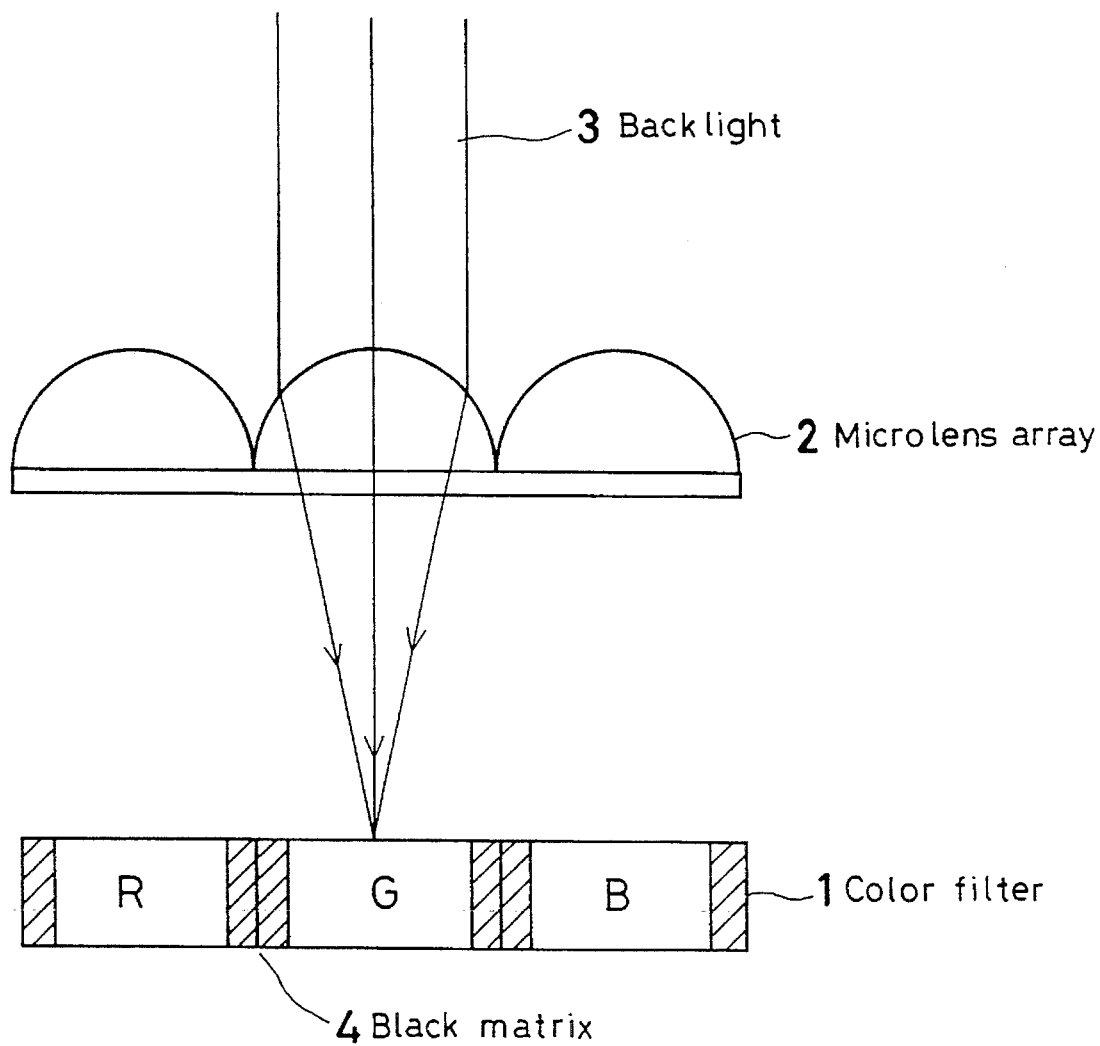
FIG. 17 illustrates a conventional process for illuminating a liquid crystal display device.

One embodiment of a direct-view liquid crystal display device including therein a color filter made up of such a hologram 5 or hologram assembly 5' as mentioned above will now be explained with reference to FIG. 6. As illustrated, a liquid crystal display element 10 is built up of a twisted nematic or other liquid crystal layer 15 sandwiched between two glass substrates 11 and 11. One glass substrate 11 is provided with a transparent opposite electrode 12 on its inside surface, while the other is provided on its inside surface with independent transparent display electrodes 13 corresponding to liquid crystal cells R, G and B. To keep the liquid crystal cells R, G and B spaced away from each other and prevent stray light from entering the adjacent cells, a black matrix 14 is located between the adjacent cells. In this case, note that such a conventional absorption filter as shown in FIG. 17 is omitted from the arrangement. Hence, if a voltage applied between the transparent display electrodes 12 and 13 for each cell is controlled to change the state of transmission, it is then possible to control the color displayed by the pixel comprising a set of liquid crystal cells R, G and B, thus making it possible to provide color displays. On the outer surface of the glass substrate 11 located on the viewing side, there is provided a polarizing plate 16, and on the outer surface of the glass substrate 11 located on the side of incidence of backlight there is applied a diffusing plate 17. Then, on the incident side of the liquid crystal display element 10 there is located a spectral diffraction hologram 5 or hologram assembly 5' such as one explained with reference to FIGS. 1–5. In this case, an additional polarizing plate 18 is provided on the incident side, with the axis of transmission intersecting, for instance, at right angles with the axis of transmission of the polarizing plate 16.

In this arrangement, white backlight 3 is converted through the polarizing plate 18 into linearly polarized light. By the hologram 5 less dependent on wavelength or the hologram assembly 5' selective in terms of wavelength and angle, the red, green and blue components of the linearly polarized light are converged at the positions of the liquid crystal cells R, G and B, respectively. These components are then diffused by the diffuser 17 onto the corresponding liquid crystal cells R, G and B, so that they can pass through the cells while their planes of polarization are rotated depending on their states of transmission. Then, the additional polarizing plate 16 makes them appear as light having a modulated intensity, which in turn reaches the eyes of the viewer. In other words, depending on the proportion of the wavelengths passing through a set of three liquid crystal cells R, G and B forming one pixel, a pixel of different color is displayed.

Figure 6:
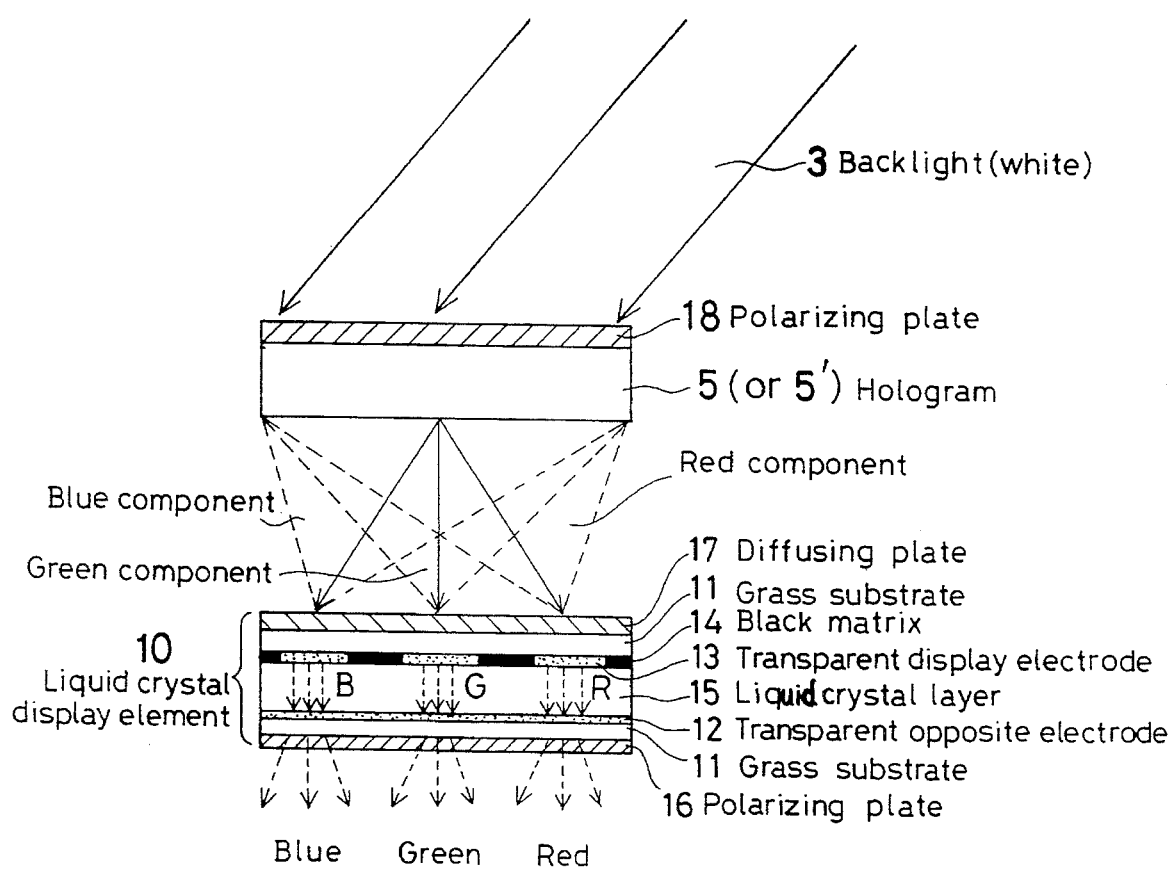
FIG. 6 is a schematic of a liquid crystal display panel (or element) in which the color filter according to the invention is incorporated.

In connection with the arrangement shown in FIG. 6, it is noted that the diffusing plate 17 may be located on the viewing side, rather than the incident side, of the liquid crystal display element 10. To increase the degree of diffusion, a combined Fresnel lens and lenticular lens may be used for the diffuser 17. It is also understood that if the liquid crystal display device used is of a projection type, it is then unnecessary to use the diffusing plate 17.

In a modification of this arrangement, the polarizing plate 18 may be located between the hologram 5 or hologram assembly 5' and the liquid crystal display element 10. Moreover, while the black matrixes 14 are used to prevent any entrance of stray light into the adjacent cells and cut off light of wavelengths other than R, G and B wavelengths, which may otherwise enter between the liquid crystal cells through the hologram 5 or hologram assembly 5' to intensify contrast and saturation, no reliance may be on them.

Figure 7:
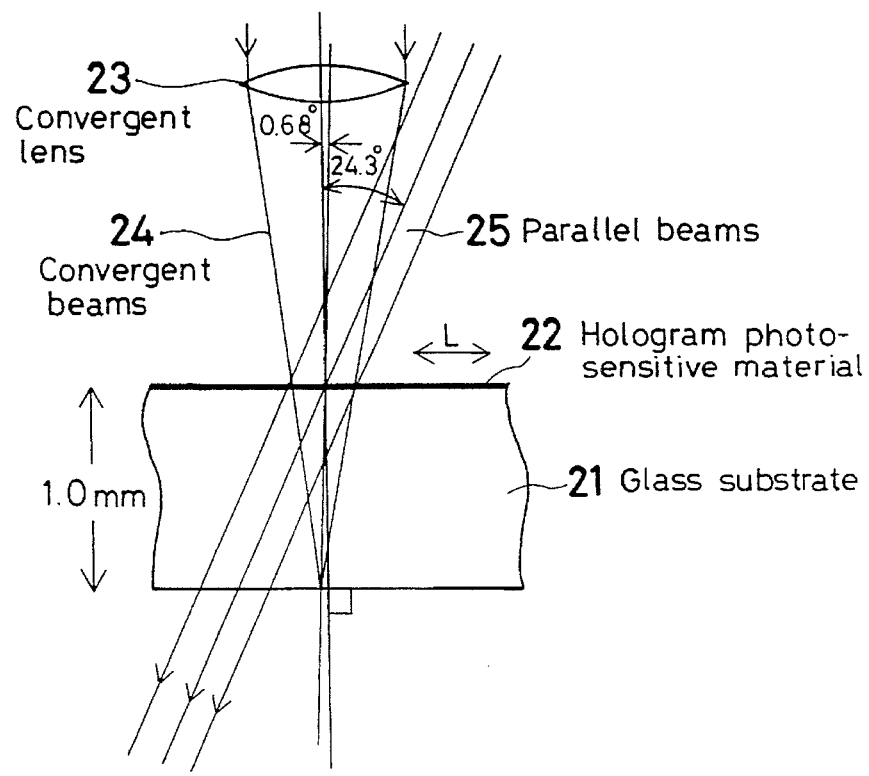
FIG. 7 is a schematic of an optical system for recording the hologram shown in FIG. 2.

Reference will now be made to two embodiments of how to fabricate such an array form of hologram 5 or hologram assembly 5' as mentioned above. According to one embodiment of the present invention, microholograms forming an array form of holograms are produced by two-beam interference holography. FIG. 7 is a schematic of an optical system for holography, in which backlight 3 is allowed to be incident at a predetermined angle with the normal line of the hologram 5, as shown in FIG. 2. Convergent beams 24 coming from a convergent lens 23 are allowed to strike almost vertically on a hologram photosensitive medium 22, while parallel beams 25 are made to strike on the photosensitive medium 22 at an angle with the normal line thereof, which is nearly equal to the predetermined angle θ. Consequently both the beams are made to interfere with each other to produce and record a microhologram in the photosensitive medium. Then, the photosensitive medium 22 is relatively moved by a distance corresponding to the pixel pitch L of the liquid crystal display element 10 to produce and record the adjacent microhologram. This process is stepped and repeated to record an array form of holograms all over the hologram photosensitive medium 22. Finally, the photosensitive medium 22 is developed to fabricate a converging hologram 5 or hologram assembly 5'. The convergent and parallel beams 24 and 25 are obtained by splitting light emitted from the same light source into two parts, and so are of coherence with each other. In place of the step-and-repeat process, use may be made of juxtaposed sets of optical systems for holography, in which case a plurality of microholograms are produced and recorded at the same time.

Figure 8:
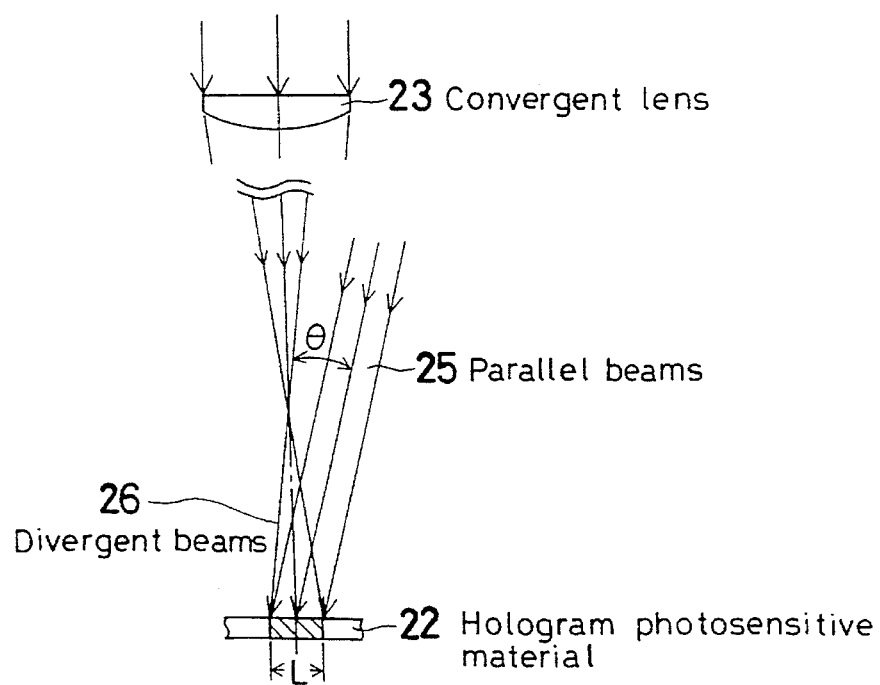
FIG. 8 is a schematic of another optical system for recording the hologram shown in FIG. 2.

In the embodiment shown in FIG. 7, the convergent and parallel beams 24 and 25 are made to strike on the hologram photosensitive medium 22 at the predetermined angle, so that they are allowed to interfere with each other to produce and record microholograms. FIG. 8 is a modification of the embodiment shown in FIG. 7, wherein divergent and parallel beams 26 and 25 are allowed to strike on a hologram photosensitive medium 22 at a given angle θ to produce and record one microhologram. If this process is stepped and repeated, a similar array form of hologram 5 or hologram assembly 5' may be obtained. In this case, it is noted that backlight 3 is made to strike on the hologram from the direction opposite to that for hologram recording.

Figure 9:
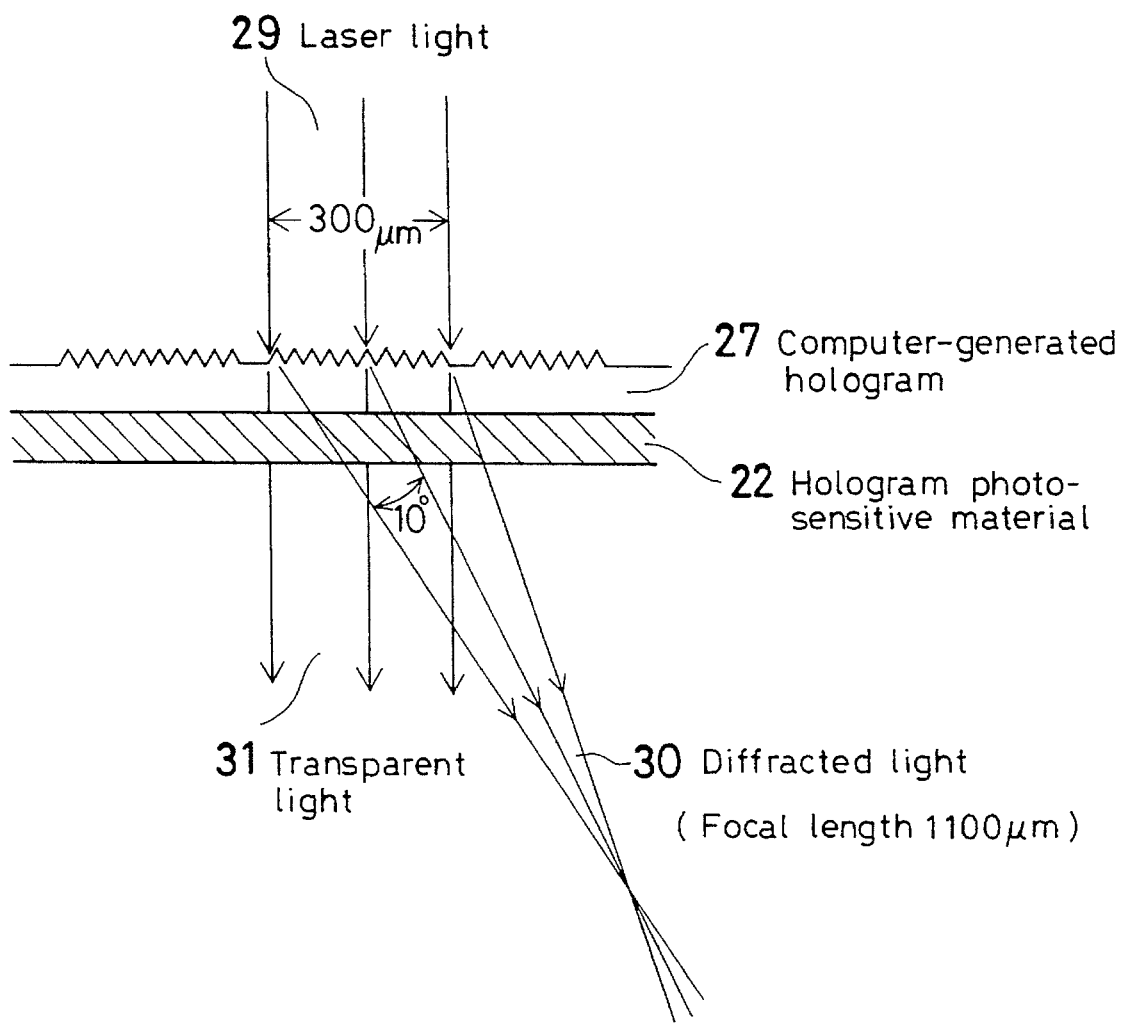
FIG. 9 is a schematic of another hologram fabrication process according to the invention.

Reference will now be made to another embodiment of how to fabricate such an array form of converging hologram 5 or hologram assembly 5' as mentioned above. Basically the second process involves computing hologram interference fringes for the hologram 5 or hologram assembly 5' comprising an array form of microholograms with the use of a computer, and writing the thus computed fringes onto an electron beam resist by electron beams for development, thereby producing a computer-generated hologram (CGH) 27. Then, while the thus produced computer-generated hologram 27 is superposed on a hologram photosensitive medium 22 with or without some gap, as shown in FIG. 9, laser light 29 corresponding to the backlight 3 (FIG. 1) is made to strike on the computer-generated hologram 27. Then, the hologram 27 produces converging diffracted beams 30 and rectilinearly propagating beams 31, which then interfere with each other in the photosensitive medium 22 for copying the hologram. The thus copied hologram may immediately be used as an array form of converging hologram 5 or hologram assembly 5'. Alternatively, this hologram may be used as the original to make a copy of an array form of converging hologram 5 or hologram assembly 5'.

Here the production process shown in FIG. 7 will be explained more illustratively. The photosensitive material for the photosensitive medium 22 used was made of a photopolymer (Omnidex 352, Du Pont) having a film thickness of 10 μm and a refractive index difference Δn of 0.03. The light source used was an argon 5 W laser of 514.5 nm wavelength (Model SP 2020-055, Spectraphysic) which worked on a 514.5 nm single mode at a current of 30 A and an output of 0.1 W. The convergent beams 24 used were made of light condensed by a convergent lens 23 having a focal length of 106 mm with the optic axis lying at an angle of 0.68° with the normal line of the photosensitive medium 22 and the focal point lying on the back surface of a 1.0 mm-thick glass substrate 21 located behind the photosensitive medium 22. The parallel beams 25 used were made of those lying on the same side at an angle of 24.3° with the normal line of the photosensitive medium 22. Hologram recording was done under the following conditions, and post-treatments were again carried out under the following conditions.

Recording Conditions

Intensity of object light (as measured on dry photographic plate: 0.5 mW/cm$^2$
Intensity of reference light (as measured on dry photographic plate: 0.5 mW/cm$^2$
Total: 1.0 mW/cm$^2$
Hologram-recording time: 40 seconds
Exposure: 40 mJ/cm$^2$ Post-Treatment Conditions Irradiation with ultraviolet rays: 10 minutes at 100 mJ/cm$^2$
Heating: 120° C. for 2 hours
Hologram size: 48 mm high×300 μm wide in striped configuration The efficiency of diffraction of the hologram 5 produced under these conditions was measured by means of a spectrophotometer (Recording Spectrophotometer UV365, Shimadzu Corporation). As a result, the following results were obtained at the following center wavelengths of a color liquid crystal display device.

Blue (460 nm): 73%

Green (545 nm): 98%

Red (610 nm): 91%

Figure 10:
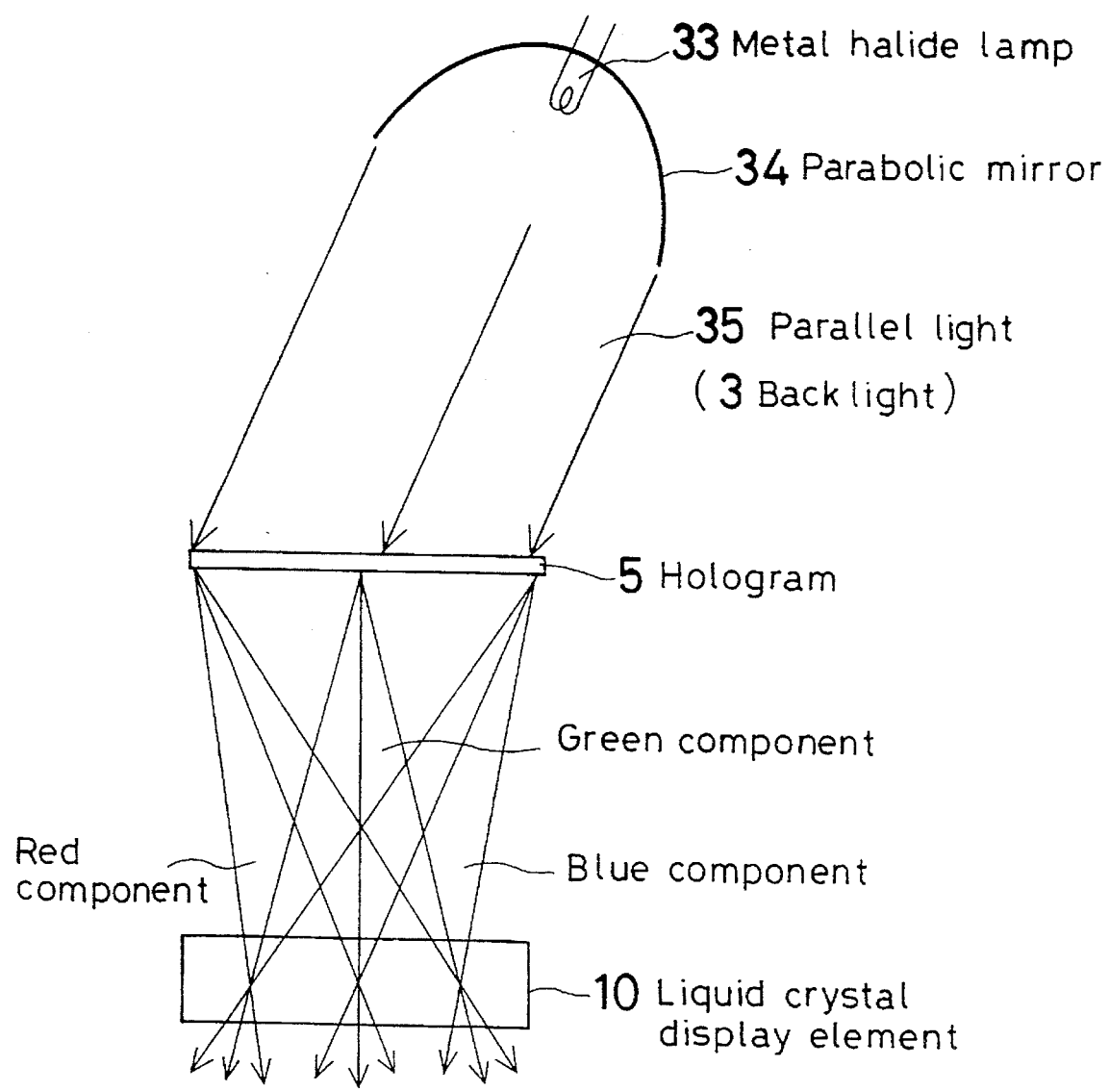
FIG. 10 is a schematic of an arrangement for confirming the degree of an improvement in the efficiency of utilization of backlight by the hologram according to the invention.

Then, confirmative experimentation was done to determine to what degree the efficiency of utilization of backlight was actually improved when this hologram 5 was built in the arrangement shown in FIG. 10. The backlight 3 was made from a metal halide lamp (Lamp 33, Iwasaki Electric Co., Ltd.) in combination with a parabolic mirror 34 for irradiating the hologram 5 with parallel beams 35. The parallelism of the parallel beams 35 lies within the range of about ±5° from the center angle. The liquid crystal display panel (or element) 10 to be illuminated by spectral light emerging from the hologram 5, was made of a conventional TFT liquid crystal display device from which such a color filter 1 as shown in FIG. 17 was removed. It is here understood that no diffusing plate was used in this experiment.

In such a system, the efficiency of utilization of backlight 3 was measured with the use of a color luminance meter (Model BM-5, Topkon K.K.). For the purpose of comparison, the color filter of the conventional liquid crystal display device used has the following specification.
Aperture factor: 35% for each cell
Transmittance of color filter: 67% for R 65% for G 63% for B
Color filter size: 3 inches diagonal (the number of pixsels are 640×480)

For the purpose of comparison with a conventional type, the same backlighting device was used with the exception of the color filter. Both the systems were measured in terms of the efficiency of utilization of backlight. The results of comparison are set out below in Tables 1 and 2.

TABLE 1

| Efficiency of utilization of backlight per color | | |
| --- | --- | --- |
| | Prior Art (Color Filter) | Invention (Hologram) |
| Red | 7.8% | 82.0% |
| Green | 7.6% | 88.0% |
| Blue | 7.4% | 65.7% |

TABLE 2

| Improvement in the efficiency of utilization of backlight by use of hologram | |
| --- | --- |
| | Improvement |
| Red | × 10.5 |
| Green | × 11.6 |
| Blue | × 8.9 |

The results of experimentation carried out to confirm the effectiveness of the fabrication process shown in FIG. 9 will be given below.

Experimental Conditions

1. Hologram recording photosensitive medium 22:
   Photopolymer (Omnidex 352, Du Pont) having a film thickness of 10 μm
2. Recording laser: Argon ion laser at an output of 5 W
3. Recording wavelength: 514.5 nm
4. Computer-generated hologram 27:
   Surface relief hologram by electron beam writing Microhologram size: 300×300 μm
   Angle of diffraction: diffracted at an angle of 10° with respect to vertical incidence
   Focal length: 1100 μm (as measured upon the incidence of light of 545 nm wavelength)

By allowing the parallel beams 29 to fall vertically on the computer-generated hologram 27 under the conditions mentioned above, it was possible to fabricate the hologram array 5 made up of microholograms that had the same optical properties and size as the computer-generated hologram 27. Subsequently, the hologram photosensitive medium 22 with the hologram recorded on it was post-treated (i.e., irradiated with ultraviolet rays at about 100 mJ/cm$^2$ and heated at 120° C. for 2 hours) under the conditions prescribed by Du Pont. As a result, the efficiency of diffraction of this hologram array 5 was found to be 65% with respect to a 514.5 nm laser light.

Then, this hologram array 5 was aligned with, and bonded to, the color filter 1. The parallel white backlight beams 3 were allowed to be incident from a light source comprising a combined metal halide lamp (Iwasaki Electric Co., Ltd.) and parabolic mirror onto the assembly to measure the intensity of the light transmitted through each of the filter cells R, G and B with the use of a luminance meter. As a result, the effectiveness of the present invention could well be confirmed by a 40–50% improvement over the conventional system made up solely of a microlens array such as one shown in FIG. 17.

Then, another experiment was done to make copies by using this hologram array 5 as the original. To this end, the hologram array 5 duplicated as mentioned above was first bonded to an unexposed photosensitive material Omnidex 352 (Du Pont) through an index matching solution (xylene) so as to eliminate any difference in the refractive index on the interface. Subsequently, the assembly was illuminated by laser light emitted from the same argon laser as used in the above experiment at the same angle at which the hologram array 5 was recorded. As a result, the laser light was separated into diffracted light and transmitted light, which in turn interfered with each other in the unexposed photosensitive material, thus giving rise to the same interference fringes as those of the original.

Figure 11:
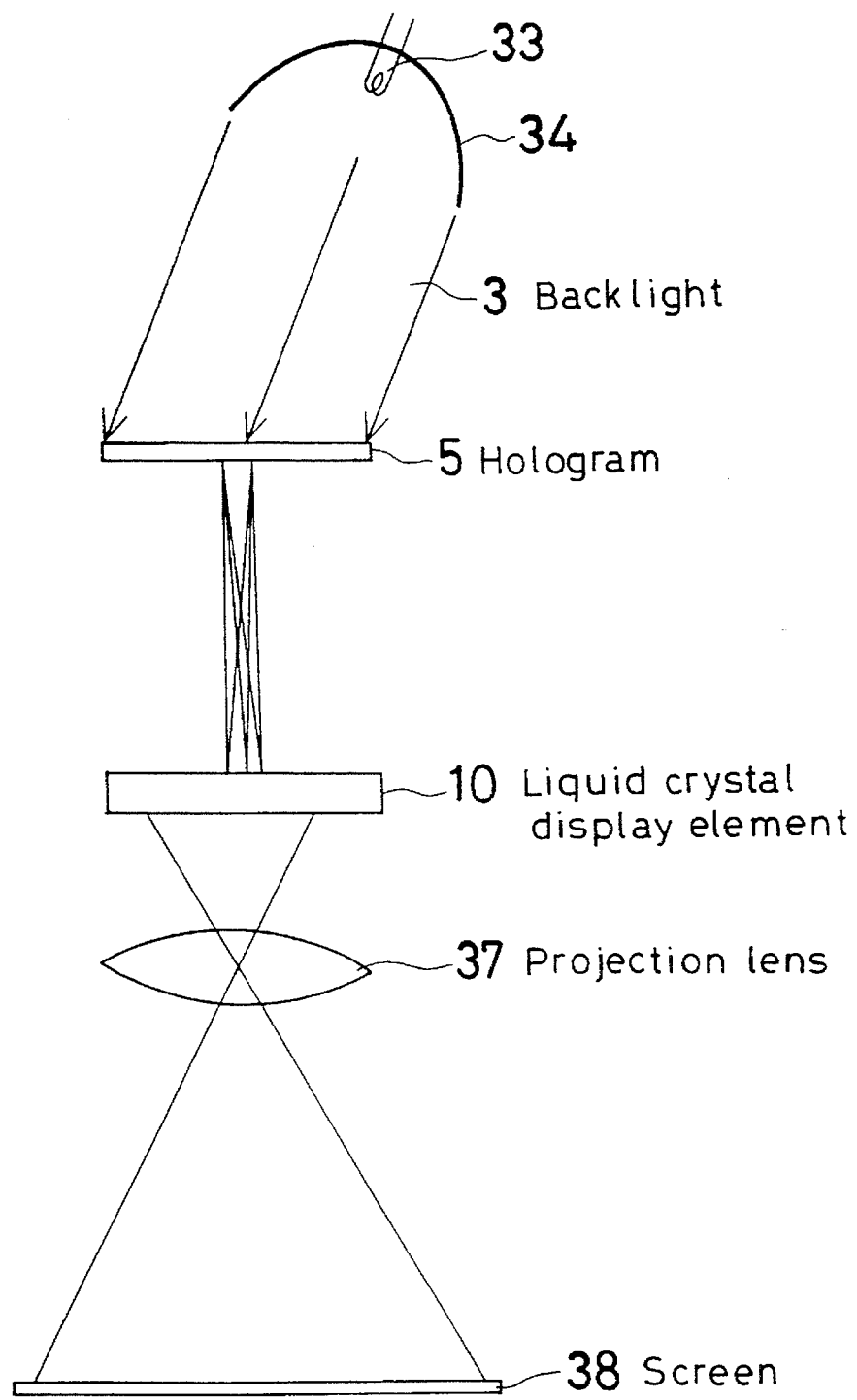
FIG. 11 is a schematic of an arrangement in which the hologram according to the invention is built in a liquid crystal projector.

While the color filter making use of the hologram 5 or hologram assembly 5' according to the present invention has been described as being applied to a direct-view liquid crystal display device, it is understood that if a projection lens 37 and an image-forming screen 38 are located between the liquid crystal display device 10 and the viewer, as shown in FIG. 11, the liquid crystal display device 10 can then be used as a liquid crystal projector for projecting and displaying an image on an enlarged scale.

It is here noted that if the hologram 5 or hologram assembly 5' used as such a color filter is reconstructed by allowing the backlight 3 to be incident thereon under the same conditions as those applied for hologram recording, it is then possible to achieve satisfactory effects in terms of the efficiency of diffraction, the angle of diffraction, and so on. However, if the reconstructing conditions differ from the hologram-recording conditions, those effects are drastically weakened. In other words, the effects obtained by use of the hologram 5 or hologram assembly 5' diminish when usual illumination light that used is scattered light.

Figure 12:
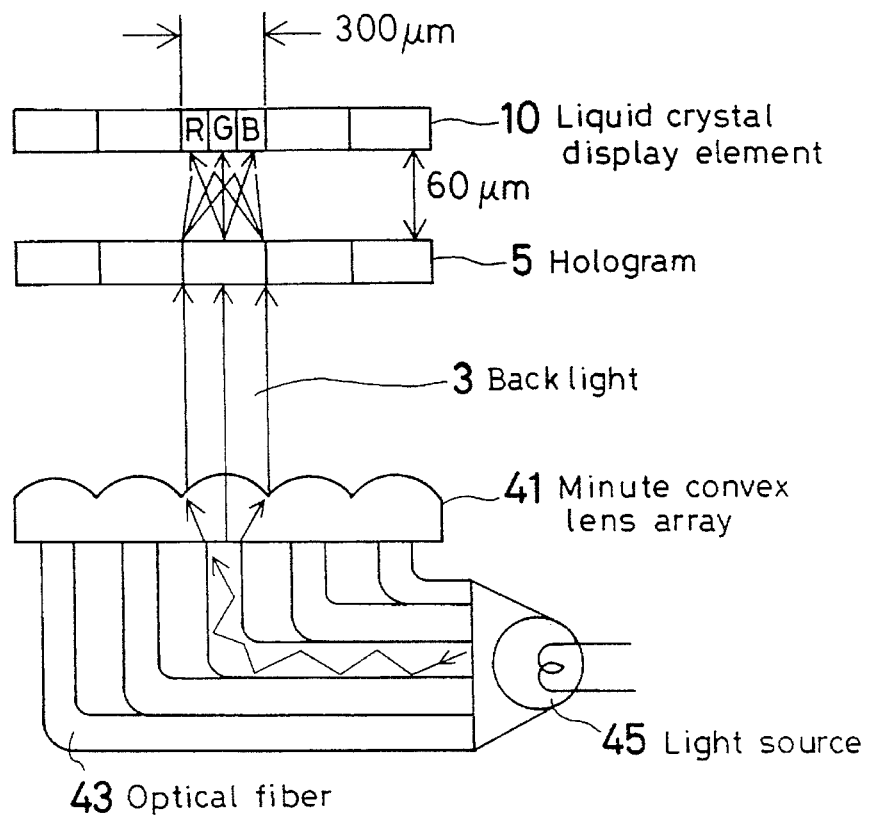
FIG. 12 is a schematic of one construction of the device for illuminating a liquid crystal display device.
Figure 13:
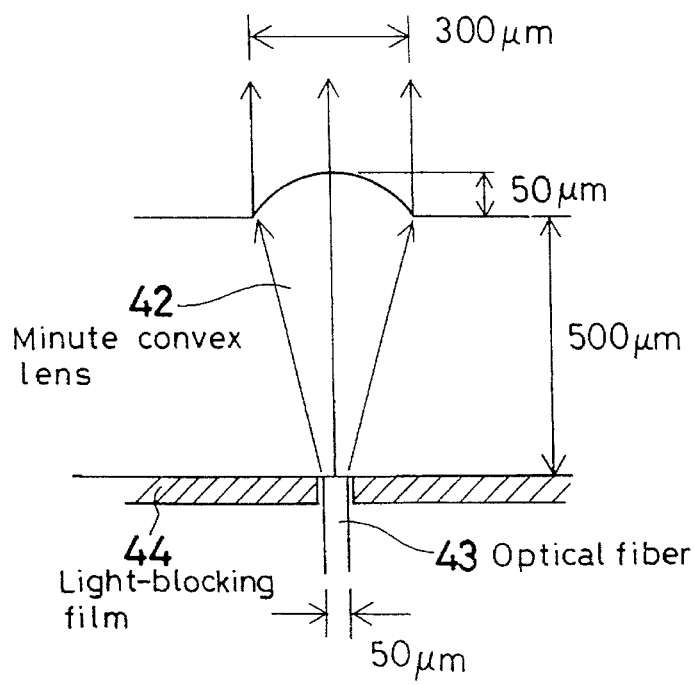
FIG. 13 is a partly enlarged view of FIG. 12.

For this reason, it is desired to use an illuminant device capable of illuminating an object by parallel beams emanating uniformly the surface thereof, as explained below. By using this device, for instance, it is possible to increase the efficiency of the hologram for which parallel reference beams are used during hologram recording. One construction of this illuminant arrangement is illustrated in FIG. 12. A hologram 5 (or hologram assembly 5') having a spectral action, such as one shown in FIG. 1 or 2 as an example, is positioned on the side of incidence of backlight 3, while it is in alignment with each pixel made up of a set of trichromatic liquid crystal cells R, G and B of a liquid crystal display device. On the side of incidence of backlight 3 on the hologram 5 there is an array 41 of minute convex lenses with the pitch corresponding to that of the microhologram array. Then, as shown in FIG. 13 on a partly enlarged scale, one end of optical fibers 43 are positioned at the focal positions of the minute convex lenses forming the array 41. It is here noted that the surface portions of the focal planes of the convex lenses 42 (except for the end portions of the optical fibers 43) are covered with light-blocking films 44 so as to prevent extraneous light from entering the illuminant device. The other ends of the optical fibers 43 corresponding to the minute convex lenses 42 are bundled together, and located in opposition to a light source 45, e.g., a metal halide lamp.

In this arrangement, the illumination light is incident from the light source onto the other end of each optical fiber 43 and is guided through the optical fiber 43 to the one end. Then, as shown in FIG. 13, divergent light emanating from the secondary point light source formed by the one end of the optical fiber 43 is converted on the lens surface of the minute convex lens 42 into parallel beams 3, which are in turn incident onto the corresponding microhologram of the hologram 5, where they are spectrally diffracted into red, green and blue components. These components then fall on the liquid crystal cells R, G and G, providing a bright color display. Thus, since the hologram 5 is illuminated by the parallel beams according to the hologram-recording conditions, the efficiency of diffraction and the spectral characteristics are kept at levels high-enough to make the efficiency of utilization of the illumination light high.

Figure 14:
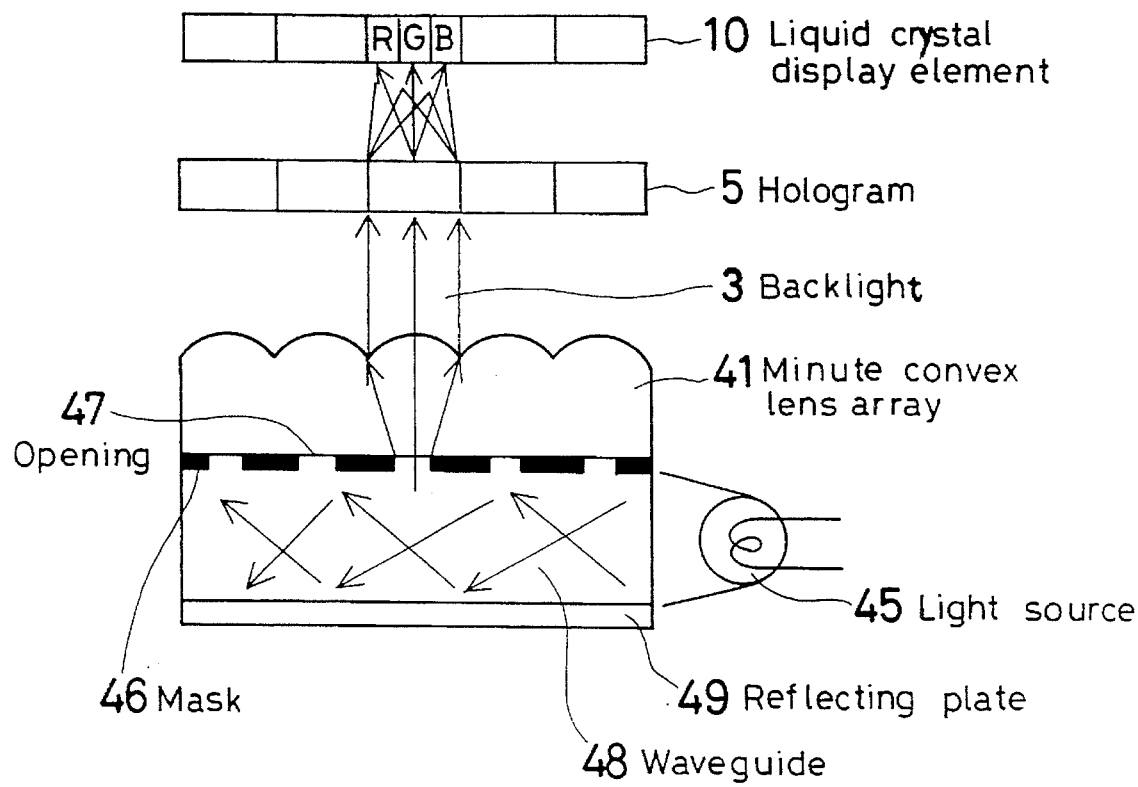
FIG. 14 is a sectional view of another construction of the device for illuminating a liquid crystal display device.
Figure 15:
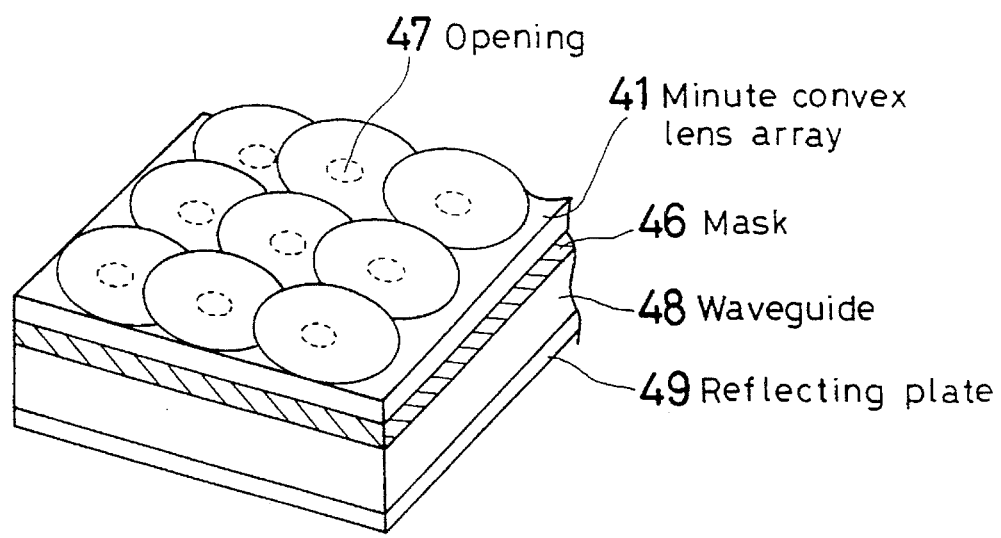
FIG. 15 is a perspective view of main parts of the device shown in FIG. 14.

Next, reference will be made to an example of using a waveguide 48 in place of the optical fibers. FIG. 14 that is a sectional view of this arrangement and FIG. 15 is a perspective schematic of the main parts. A mask 46 is located behind an array 41 of minute convex lenses, and the waveguide 48 backed up with a reflecting plate 49 is positioned at the back side of the mask 46. The mask 46 has minute openings 47 at the focal positions of the minute convex lenses 42 forming the array 41, with the rest of the mask 46 cutting off light and the waveguide-facing side forming a reflecting surface. Then, one side surface of the waveguide 48 is mounted in opposition to a light source 45. Illumination light is incident from the light source 45 onto the waveguide 48 from the opposite direction, and is guided through the waveguide 48 while it is subjected to multiple reflection between the reflecting plate 49 and the reflecting surface of the mask 46, during which some light leaks out of the openings 47 in the mask 46. Each opening 47 serves as a secondary point light source that emits divergent light, which is then converted on the lens surface of the minute convex lens 42 into parallel beams 3. These beams are in turn incident onto the corresponding microhologram of the hologram 5, where they are spectrally diffracted into red, green and blue components. These components then fall on the liquid crystal cells R, G and G, providing a bright color display. Here, too, the hologram 5 is illuminated by the parallel beams according to the hologram-recording conditions, so that the efficiency of diffraction and the spectral characteristics are kept at levels high-enough to make the efficiency of utilization of the illumination light high.

Figure 16:
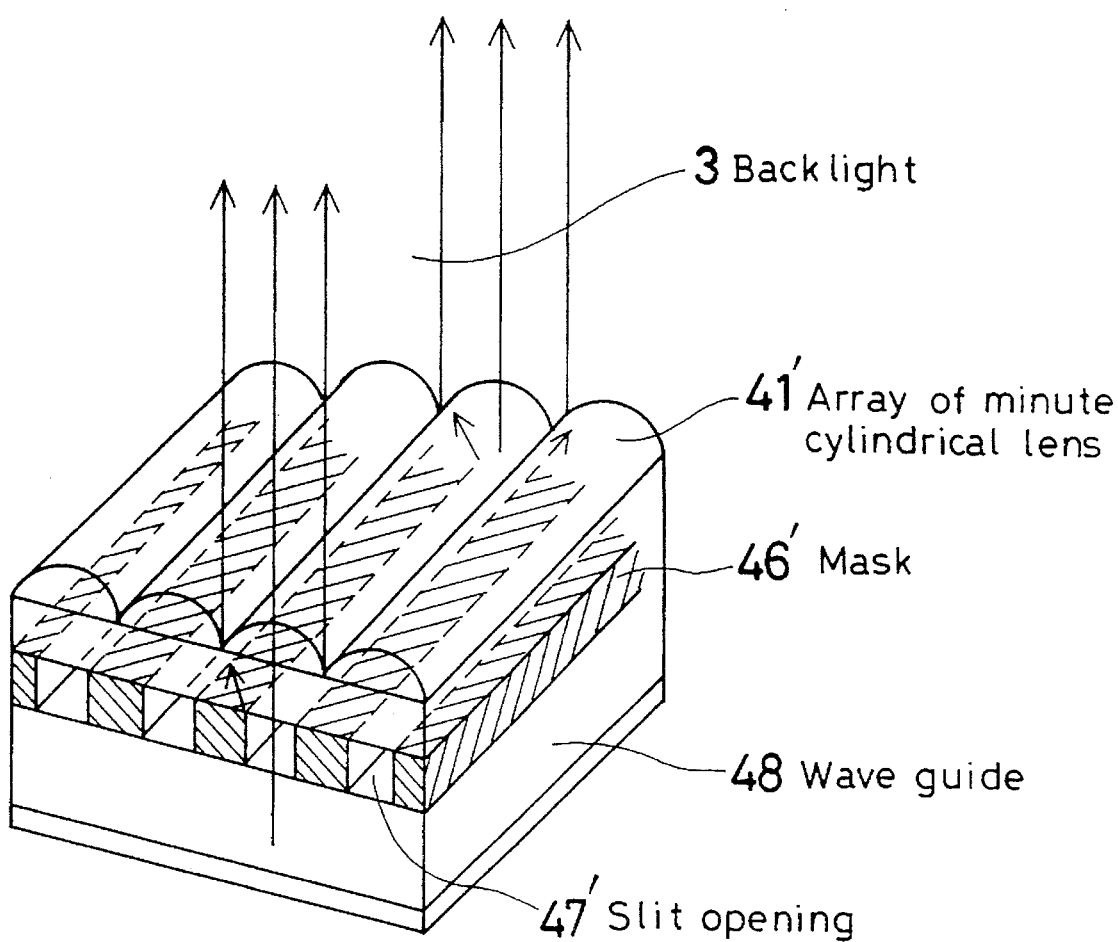
FIG. 16 is a perspective view of main parts in a modification of the construction shown in FIG. 14.

While the arrangement shown in FIGS. 14 and 15 has been explained as using isotropic, (e.g., square or circular forms of liquid crystal cells R, G and B) it is understood that when cells are used in elongate, striped configuration, corresponding to those of the cells. FIG. 16 is a perspective schematic of the main parts used in such a modification. In this arrangement, an array 41' of minute cylindrical lenses having generatrix lines in the striped direction and a length equal to those of such lines is used as an alternative to the array of minute convex lenses. A mask 46' is designed to have slit openings 47' at the caustic line positions of the minute cylindrical lenses. This arrangement is otherwise similar to that shown in FIGS. 14 and 15.

While the hologram color filter according to the present invention, the liquid crystal display device using the same, and the fabrication process of the same have been described with reference to some embodiments, it should be understood that the present invention is not limited to such embodiments and so may be carried out in variously modified fashions. For instance, the hologram color filter according to the present invention may be applied to image pickup elements such as CCD image sensors wherein, as is the case with a liquid crystal display device, a trichromatic color filter is located in front of three photodetectors constituting one pixel to pick up a color image.

As can be understood from the foregoing, by use of the hologram color filter is it possible to provide a bright display or image, because incident light is spectrally diffracted by the hologram into light of different wavelength, which can in turn be emitted to a desired position at a predetermined spatial period; that is, since there is no need of passing the incident light through a color filter, there is a limited loss by absorption. Moreover, since efficiently spectrally diffracted light can be converged at a given positions, it is possible to make full use of the wavelength components of backlight for color filters, etc., thereby achieving some considerable improvement in the efficiency of utilization of the backlight.

Any color filter can be dispensed with by built such a hologram color filter in a liquid crystal display device or CCD image sensor. In addition, such display devices or sensors can be fabricated at low cost but with an improved reliability, etc., because backlighting can be carried out with devices of small size and low power.

What is claimed is:

1. A hologram color filter, comprising:
   a hologram, wherein incident light is spectrally diffracted by said hologram into spectral components of different wavelength, wherein one of said spectral components is emitted to a desired position at a predetermined spatial period, and wherein said hologram has an efficiency of diffraction independent, or less dependent, on wavelength.

2. A hologram color filter as claimed in claim 1, wherein said hologram is produced by disposing converging unit holograms in an array wherein said converging unit holograms have an efficiency of diffraction independent, or less dependent, on wavelength.

3. A hologram color filter as claimed in claim 2, wherein said hologram color filter is located on a light-incident side of an imaging device made up of a periodic arrangement of photodetection elements.

4. A hologram color filter as claimed in claim 2, wherein said hologram color filter is located on a side of a liquid crystal display element onto which backlight is incident and wherein said liquid crystal display element comprises a periodic arrangement of liquid crystal cells.

5. A hologram color filter as claimed in claim 4, wherein said hologram color filter is located on said side of said liquid crystal display element onto which backlight is incident and wherein said liquid crystal display element comprises means for projecting an image displayed by said liquid crystal display.

6. A hologram color filter as claimed in claim 4, wherein said liquid crystal display element comprises a light-blocking means at a position corresponding to a region between said liquid crystal cells.

7. A hologram color filter as claimed in claim 6, wherein said hologram color filter is located on said side of said liquid crystal display element onto which backlight is incident and wherein said liquid crystal display element comprises means for projecting an image displayed by said liquid crystal display.

8. A hologram color filter as claimed in claim 6, wherein an additional color filter is disposed between said liquid crystal display element and said light-blocking means.

9. A hologram color filter as claimed in claim 4, wherein a light-diffusing means is located at any position on said light-emerging side of said hologram.

10. A hologram color filter as claimed in claim 9, wherein said hologram color filter is located on said side of said liquid crystal display element onto which backlight is incident and wherein said liquid crystal display element comprises means for projecting an image displayed by said liquid crystal display.

11. A hologram color filter as claimed in claim 9, wherein said liquid crystal display element comprises a light-blocking means at a position corresponding to a region between said liquid crystal cells.

12. A hologram color filter as claimed in claim 11, wherein said hologram color filter is located on said side of said liquid crystal display element onto which backlight is incident and wherein said liquid crystal display element comprises means for projecting an image displayed by said liquid crystal display.

13. A hologram color filter as claimed in claim 11, wherein an additional color filter is disposed between said liquid crystal display element and said light-blocking means.

14. A hologram color filter as claimed in claim 1, wherein said hologram comprises uniform interference fringes with an efficiency of diffraction independent, or less dependent, on wavelength and wherein an array of converging elements is arranged on a light-striking or emerging side of said hologram.

15. A hologram color filter as claimed in claim 14, wherein said hologram color filter is located on a light-incident side of an imaging device made up of a periodic arrangement of photodetection elements.

16. A hologram color filter as claimed in claim 14, wherein said hologram color filter is located on a side of a liquid crystal display element onto which backlight is incident and wherein said liquid crystal display element comprises a periodic arrangement of liquid crystal cells.

17. A hologram color filter as claimed in claim 16, wherein said hologram color filter is located on said side of said liquid crystal display element onto which backlight is incident and wherein said liquid crystal display element is used for projecting an image displayed by said liquid crystal display.

18. A hologram color filter as claimed in claim 16, wherein said liquid crystal display element comprises a light-blocking means at a position corresponding to a region between said liquid crystal cells.

19. A hologram color filter as claimed in claim 18, wherein said hologram color filter is located on said side of said liquid crystal display element onto which backlight is incident and wherein said liquid crystal display element is used for projecting an image displayed by said liquid crystal display.

20. A hologram color filter as claimed in claim 18, wherein an additional color filter is disposed between said liquid crystal display element and said light-blocking means.

21. A hologram color filter as claimed in claim 16, wherein a light-diffusing means is located at any position on said light-emerging side of said hologram.

22. A hologram color filter as claimed in claim 21, wherein said hologram color filter is located on said side of said liquid crystal display element onto which backlight is incident and wherein said liquid crystal display element is used for projecting an image displayed by said liquid crystal display.

23. A hologram color filter as claimed in claim 21, wherein said liquid crystal display element comprises a light-blocking means at a position corresponding to a region between said liquid crystal cells.

24. A hologram color filter as claimed in claim 23, wherein said hologram color filter is located on said side of said liquid crystal display element onto which backlight is incident and wherein said liquid crystal display element comprises means for projecting an image displayed by said liquid crystal display.

25. A hologram color filter as claimed in claim 23, wherein an additional color filter is disposed between said liquid crystal display element and said light-blocking means.

26. A hologram color filter as claimed in claim 1, wherein said hologram color filter is located on a side of a liquid crystal display element onto which backlight is incident and wherein said liquid crystal display element comprises a periodic arrangement of liquid crystal cells.

27. A hologram color filter as claimed in claim 26, wherein a light-diffusing means is located at any position on a light-emerging side of said hologram.

28. A hologram color filter as claimed in claim 27, wherein said hologram color filter is located on said side of said liquid crystal display element onto which backlight is incident and wherein said liquid crystal display element is used for projecting an image displayed by said liquid crystal display.

29. A hologram color filter as claimed in claim 27, wherein said liquid crystal display element comprises a light-blocking means at a position corresponding to a region between said liquid crystal cells.

30. A hologram color filter as claimed in claim 29, wherein said hologram color filter is located on said side of said liquid crystal display element onto which backlight is incident and wherein said liquid crystal display element is used for projecting an image displayed by said liquid crystal display.

31. A hologram color filter as claimed in claim 29, wherein an additional color filter is disposed between said liquid crystal display element and said light-blocking means.

32. A hologram color filter as claimed in claim 26, wherein said liquid crystal display element comprises a light-blocking means at a position corresponding to a region between said liquid crystal cells.

33. A hologram color filter as claimed in claim 32, wherein said hologram color filter is located on said side of said liquid crystal display element onto which backlight is incident and wherein said liquid crystal display element is used for projecting an image displayed by said liquid crystal display.

34. A hologram color filter as claimed in claim 32, wherein an additional color filter is disposed between said liquid crystal display element and said light-blocking means.

35. A hologram color filter as claimed in claim 26, wherein said hologram color filter is located on said side of said liquid crystal display element onto which backlight is incident and wherein said liquid crystal display element is used for projecting an image displayed by said liquid crystal display.

36. A hologram color filter as claimed in claim 1, wherein said hologram color filter is located on a light-incident side of an imaging device made up of a periodic arrangement of photodetection elements.

37. A liquid crystal display device, comprising:

a hologram color filter, which is illuminated by backlight from behind to provide a color display, wherein said hologram filter comprises a hologram which has an efficiency of diffraction independent, or less dependent, on wavelength is located on a side of said liquid crystal display device onto which said backlight is incident and liquid crystal cells, wherein wavelength components of said backlight which are spectrally diffracted by said hologram are allowed to strike onto said liquid crystal cells for creating corresponding colors of said color display.

38. A liquid crystal display device as claimed in claim 37, wherein a light-blocking means is located at a position corresponding to a region between said liquid crystal cells.

39. A liquid crystal display device as claimed in claim 38, wherein a photopolymer is used as a material for recording said hologram.

40. A liquid crystal display device as claimed in claim 38, wherein a converging element corresponding to each of said liquid crystal cells is located between said hologram and each of said liquid crystal cells.

41. A liquid crystal display device as claimed in claim 38, wherein said hologram comprises uniform interference fringes with said efficiency of diffraction independent, or less dependent, on wavelength, and wherein converging elements are arranged on a side of said hologram on which said backlight strikes or from which said backlight is emitted, and wherein each of said converging elements corresponds to three liquid crystal cells which are adjacent to each other.

42. A liquid crystal display device as claimed in claim 38, wherein said hologram comprises an array of converging unit holograms, wherein each of said converging unit holograms corresponds to three liquid crystal cells which are adjacent to each other, and wherein each converging unit hologram spectrally diffracts said backlight, which substantially obliquely strikes a hologram plane, onto a set of liquid crystal cells in in-line configuration.

43. A liquid crystal display device as claimed in claim 38, wherein said hologram comprises an array of converging unit holograms, wherein each of said converging unit holograms corresponds to three liquid crystal cells which are adjacent to each other, and wherein each converging unit hologram spectrally diffracts said backlight, which substantially vertically strikes a hologram plane of said hologram, onto a set of liquid crystal cells in offset configuration.

44. A liquid crystal display device as claimed in claim 38, wherein another color filter of a different color is periodically located with respect to an adjacent liquid crystal cell.

45. A liquid crystal display device as claimed in claim 44, wherein a photopolymer is used as a material for recording said hologram.

46. A liquid crystal display device as claimed in claim 44, wherein a converging element corresponding to each of said liquid crystal cells is located between said hologram and each of said liquid crystal cells.

47. A liquid crystal display device as claimed in claim 44, wherein said hologram comprises uniform interference fringes with said efficiency of diffraction independent, or less dependent, on wavelength, and wherein converging elements are arranged on a side of said hologram on which said backlight strikes or from which said backlight is emitted, and wherein each of said converging elements corresponds to three liquid crystal cells which are adjacent to each other.

48. A liquid crystal display device as claimed in claim 44, wherein said hologram comprises an array of converging unit holograms, wherein each of said converging unit holograms corresponds to three liquid crystal cells which are adjacent to each other, and wherein each converging unit hologram spectrally diffracts said backlight, which substantially obliquely strikes a hologram plane, onto a set of liquid crystal cells in in-line configuration.

49. A liquid crystal display device as claimed in claim 44, wherein said hologram comprises an array of converging unit holograms, wherein each of said converging unit holograms corresponds to three liquid crystal cells which are adjacent to each other, and wherein each converging unit hologram spectrally diffracts said backlight, which substantially vertically strikes a hologram plane of said hologram, onto a set of liquid crystal cells in offset configuration.

50. A liquid crystal display device as claimed in claim 37, wherein another color filter of a different color is periodically located with respect to an adjacent liquid crystal cell.

51. A liquid crystal display device as claimed in claim 50, wherein a photopolymer is used as a material for recording said hologram.

52. A liquid crystal display device as claimed in claim 50, wherein a converging element corresponding to each of said liquid crystal cells is located between said hologram and each of said liquid crystal cells.

53. A liquid crystal display device as claimed in claim 50, wherein said hologram comprises uniform interference fringes with said efficiency of diffraction independent, or less dependent, on wavelength, and wherein converging elements are arranged on a side of said hologram on which said backlight strikes or from which said backlight is emitted, and wherein each of said converging elements corresponds to three liquid crystal cells which are adjacent to each other.

54. A liquid crystal display device as claimed in claim 50, wherein said hologram comprises an array of converging unit holograms, wherein each of said converging unit holograms corresponds to three liquid crystal cells which are adjacent to each other, and wherein each converging unit hologram spectrally diffracts said backlight, which substantially obliquely strikes a hologram plane, onto a set of liquid crystal cells in in-line configuration.

55. A liquid crystal display device as claimed in claim 50, wherein said hologram comprises an array of converging unit holograms, wherein each of said converging unit holograms corresponds to three liquid crystal cells which are adjacent to each other, and wherein each converging unit hologram spectrally diffracts said backlight, which substantially vertically strikes a hologram plane of said hologram, onto a set of liquid crystal cells in offset configuration.

56. A liquid crystal display device as claimed in claim 37, wherein said hologram comprises an array of converging unit holograms, wherein each of said converging unit holograms corresponds to three liquid crystal cells which are adjacent to each other, and wherein each converging unit hologram spectrally diffracts said backlight, which substantially vertically strikes a hologram plane of said hologram, onto a set of liquid crystal cells in offset configuration.

57. A liquid crystal display device as claimed in claim 37, wherein said hologram comprises an array of converging unit holograms, wherein each of said converging unit holograms corresponds to three liquid crystal cells which are adjacent to each other, and wherein each converging unit hologram spectrally diffracts said backlight, which substantially obliquely strikes a hologram plane, onto a set of liquid crystal cells in in-line configuration.

58. A liquid crystal display device as claimed in claim 37, wherein said hologram comprises uniform interference fringes with said efficiency of diffraction independent, or less dependent, on wavelength, wherein converging elements are arranged on a side of said hologram on which said backlight strikes or from which said backlight is emitted, and wherein each of said converging elements corresponds to three liquid crystal cells which are adjacent to each other.

59. A liquid crystal display device as claimed in claim 37, wherein a converging element corresponding to each of said liquid crystal cells is located between said hologram and each of said liquid crystal cells.

60. A liquid crystal display device as claimed in claim 37, wherein a photopolymer is used as a material for recording said hologram.

61. A liquid crystal display device as claimed in claim 37, wherein said hologram comprises a relief hologram.

62. A liquid crystal display device as claimed in claim 37, wherein said hologram comprises a computer-generated hologram.

63. A fabrication process of a hologram color filter comprising the steps of:

disposing converging unit holograms in an array wherein said converging unit holograms have an efficiency of diffraction independent, or less dependent, on wavelength and spectrally diffract light incident thereon into spectral components of different wavelength in order to emit said spectral components to a desired position at a predetermined spatial period;

producing a computer-generated hologram having properties of said converging unit holograms;

bringing said computer-generated hologram in contact with a photosensitive material or superposing said computer-generated hologram and said photosensitive material together with a gap therebetween; and illuminating said computer-generated hologram with coherent light such that light diffracted by said computer-generated hologram and undiffracted light propagated rectilinearly through said computer-generated hologram interfere with each other in said photosensitive material for reproducing a copied hologram from said computer-generated hologram.

64. A fabrication process of a hologram color filter as claimed in claim 63, wherein said copied hologram is used as an original for further copying.

65. A fabrication process of a hologram color filter comprising the steps of:

disposing converging unit holograms in an array, wherein said converging unit holograms have an efficiency of diffraction independent, or less dependent, on wavelength and spectrally diffract light incident thereon into spectral components of different wavelength in order to emit said spectral components to a desired position at a predetermined spatial period;

producing a relief computer-generated hologram having properties of said converging unit holograms;

coating a photosetting resin on a relief surface of said relief computer-generated hologram; and irradiating said photosetting resin with light for copying said relief computer-generated hologram in the form of a relief hologram onto said photosensitive resin.

* * * * *